(12) United States Patent
Fischer (10) Patent No.: US 8,874,169 B2
(45) Date of Patent: Oct. 28, 2014

(54) METHOD FOR THE CONFIGURATION OF A COMMUNICATION DEVICE AS WELL AS A COMMUNICATION DEVICE

(75) Inventor: Jens Fischer, Darmstadt (DE)

(73) Assignee: Vodafone Holding GmbH, Duesseldorf (DE)

( * ) Notice: Subject to any disclaimer, the term of this patent is extended or adjusted under 35 U.S.C. 154(b) by 0 days.

(21) Appl. No.: 13/358,965

(22) Filed: Jan. 26, 2012

(65) Prior Publication Data

US 2012/0196655 A1 Aug. 2, 2012

(30) Foreign Application Priority Data

Jan. 26, 2011 (DE) .......................... 10 2011 009 486

(51) Int. Cl.
| | |
|---|---|
| H04B 1/38 | (2006.01) |
| H04L 12/24 | (2006.01) |
| H04W 4/00 | (2009.01) |
| H04W 8/24 | (2009.01) |
| H04L 29/06 | (2006.01) |
| H04W 12/06 | (2009.01) |

(52) U.S. Cl.
CPC ........... *H04W 8/245* (2013.01); *H04L 41/0806* (2013.01); *H04L 63/0876* (2013.01); *H04W 4/001* (2013.01); *H04W 12/06* (2013.01)
USPC ..... 455/558; 455/557; 455/550.1; 455/556.1; 455/435.1; 455/411; 375/224; 370/432; 370/384; 370/524; 710/10; 713/600

(58) Field of Classification Search
CPC . H04M 1/72519; H04M 1/2745; H04W 8/20; H04B 1/3816
USPC ........ 455/558, 557, 550.1, 556.2, 556.1, 551, 455/435.1, 411, 410; 370/432, 384, 524; 375/224; 710/10; 713/600
See application file for complete search history.

(56) References Cited

U.S. PATENT DOCUMENTS 5,557,679 A * 9/1996 Julin et al. ..................... 380/249
7,023,994 B1 * 4/2006 Dupre ............................ 380/247

(Continued)

FOREIGN PATENT DOCUMENTS

| EP | 1655926 A1 | 5/2006 |
|---|---|---|
| EP | 1 748 661 A1 | 1/2007 |

OTHER PUBLICATIONS

GSM Events web page (www.gsmfordummies.com/gsmevents/attach.shtml); Jul. 22, 2009.*

(Continued)

*Primary Examiner* — Khai M Nguyen
(74) *Attorney, Agent, or Firm* — Kriegsman & Kriegsman (57) ABSTRACT

Among other things, a method is described for the configuration of a communication device (10) as well as a communication device (10). In this method, a communication link (20) is created from the communication device (10) to an external configuration computer unit (30) and identification data (100), which are related to the communication device (10), are transmitted from the communication device (10) to the external configuration computer unit (30) for the purpose of authentication of the communication device (10), with chip card-related identification features (111) being transmitted as identification data (100), with the chip card-related identification features (111) being assigned to a chip card (11) for the identification thereof, and with the chip card (11) being assigned to the communication device (10), and, when authentication is successful, a configuration of the communication device (10) is carried out.

11 Claims, 2 Drawing Sheets

(56) References Cited

U.S. PATENT DOCUMENTS

| | | | |
|---|---|---|---|
| 2003/0171112 | A1 | 9/2003 | Lupper et al. |
| 2005/0177733 | A1 | 8/2005 | Stadelmann et al. |
| 2008/0009318 | A1 | 1/2008 | Evans |
| 2010/0105375 | A1 | 4/2010 | Schroter |
| 2010/0299745 | A1* | 11/2010 | Karppinen et al. ............ 726/18 |
| 2011/0016064 | A1* | 1/2011 | Barton ............................ 706/11 |
| 2011/0294538 | A1* | 12/2011 | Phillips et al. ............. 455/550.1 |
| 2012/0108273 | A1* | 5/2012 | Lee et al. ...................... 455/458 |
| 2012/0157163 | A1* | 6/2012 | Angelhag ...................... 455/558 |
| 2012/0178402 | A1* | 7/2012 | Krishnamoorthy et al. ......................... 455/404.1 |
| 2012/0309451 | A1* | 12/2012 | Benkelberg et al. ....... 455/552.1 |

OTHER PUBLICATIONS

GSM Events web pages (www.gsmfordummies.com/gsmevents/attach.shtml); Jul. 22, 2009.*

Printout of GSM Events web page, www.gsmfordummies.com/gsmevents/attach.shtml (Jul. 22, 2009).

Office Action dated Jul. 14, 2011, in German Patent Application No. 10 2011 009 486.5.

Kotuliak et al., "Provisioning of VoIP Services for Mobile Subscribers Using WiFi Access Network," 2007 International Conference on Convergence Information Technology, pp. 1957-1962, Gyeongju, South Korea (Nov. 21-23, 2007).

* cited by examiner

METHOD FOR THE CONFIGURATION OF A COMMUNICATION DEVICE AS WELL AS A COMMUNICATION DEVICE

The present invention relates to a method for the configuration of a communication device according to the preambles of patent claim 1 and patent claim 2. The invention further relates to a communication device according to the preamble of patent claim 13.

For the use of communication devices, such as, for example, mobile phones, landline phones, or data processing units, a configuration of the communication device is often required. This configuration can be done in diverse ways.

Described in EP 1748661 B1, for example, is how configurations of a mobile communication device that are independent of a network operator may be loaded via a configuration server. For this purpose, a parameter for the network operator is stored on the subscriber identity module (SIM) card. A data link is initially created via a communication module in the communication device, so as then to be able to load the network operator-specific configurations from the configuration server.

Described in US 2008009318 A1 is how user-specific configurations, such as, for example, general packet radio service (GPRS), short message services (SMS), and multimedia messaging service (MMS) settings as well as ring tones, wallpapers, key assignments, menu settings, or homepage links, can be loaded from a configuration server. For this purpose, the communication device has a control module, in which the received network operator is identified and then a configuration appropriate to it can be loaded from the configuration server.

However, the configuration of communication devices can also take place in such a manner that a customer receives an individual numerical code for the configuration or installation of the communication device. This individual numerical code enables the network to identify the communication device of the customer so as to configure the communication device.

Expressed simply, the customer receives, for example in the case of landline connections, an individual numerical code, a so-called modem installation code, for the configuration or installation. This numerical code enables the network to identify the customer and to supply the individual DSL and voice over IP (VoIP) access data from an auto-configuration server (ACS) to the digital subscriber line (DSL) modem remotely from the network.

It has already been common for several years in the landline network to employ VoIP technology for telephony. However, to do this, the communication devices used (DSL/VoIP modems) require some individual customer configuration data, such as, for example, a VoIP account, a VoIP password, a VoIP proxy, a telephone number, and, in the case of DSL connections, additionally the DSL access account along with the password. In order to make the configuration of these communication devices facile for the end customer, a so-called ACS (auto-configuration server) is used, which precisely configures this individual configuration to the communication device. However, to do this, the ACS must be able to uniquely assign the communication device to this customer.

There already exist solutions for this in the landline network. For example, when a connection is being set up in the network, the network reports the physical connecting line from which the request is coming. Another solution provides that the customer identifies itself by entering a unique, individual, secret key, such as, for example, a numerical code. This individual numerical code is usually sent to the customer by letter and is permanently stored on hardware, such as, for example, a universal serial bus (USB) memory stick.

However, a drawback of the aforementioned solutions is that, if a customer wishes to use a communication device immediately after purchasing it, as is possible for long term evolution (LTE) mobile telephony technology, it takes too long to send such an individual numerical code by mail, for example, and immediate operation of communication devices is not possible.

Moreover, additional identification keys are required for configuration of further communication end devices and the assignment of the identification key to the respective communication devices can be confusing.

Therefore, the present invention is based on the problem of providing a method as well as a communication device with which the configuration of the communication device can be optimized.

This problem is solved in accordance with the invention by the method with the features according to the independent patent claim 1, the method with the features according to the independent patent claim 2, and the communication device with the features according to the independent patent claim 13. Further features and details of the invention ensue from the dependent claims, the description, and the drawings. Features and details that are described in connection with the first aspect of the method are obviously also applicable in connection the second aspect of the method and vice versa. Features and details that are described in connection with the method of the invention obviously also apply in connection with the communication device of the invention and vice versa, so that, in regard to the disclosure, the individual aspects of the invention are referenced and referred in full to one another.

According to the first aspect of the invention, a method for the configuration of a communication device is provided. The method is characterized in that a communication link from the communication device to an external configuration computer unit is created, that identification data relating to the communication device are transmitted from the communication device to the external computer unit for the purpose of authentication of the communication device, with chip card-related identification features being transmitted as identification data, with the chip card-related identification features being assigned to a chip card for identification thereof, and with the chip card being assigned to the communication device, and in that, once authentication is successful, a configuration of the communication device is carried out.

Configuring or configuration is understood to mean, in particular, that certain adaptions, such as, for example, settings of programs and software or hardware components of a communication device, are made. This configuration enables the communication device to be adapted to an existing system or integrated into an existing system, so that the communication device is a component of the system and may be used in it. The adaption in this case can occur such that parameters are set according to the requirements of the system.

The term installation may also be used as a synonym for the term configuration, so that the present invention is not limited to the term configuration or installation.

In accordance with the invention, the configuration is to take place for a communication device. A communication device is, for example, a piece of technical equipment or a technical device that serves to acquire, input, transmit, and output information or signals or data. Hereinafter, the term information will be used as a synonym for signals or data. The information that is to be transmitted may be, for example, voice data, with the present invention not being limited to specific kinds of information.

A communication device may be a stationary, that is, locally restricted device, such as a landline telephone, a fax machine, a personal computer, a server device, an Internet router, an Internet modem or the like. However, a communication device may also be a mobile device, such as, for example, a mobile phone, a portable computer, a netbook, a notebook, a navigation device, a personal digital assistant, or the like. The present invention is thus not limited to a specific communication device.

The configuration of the communication device takes place in accordance with the invention such that initially a communication link is created from the communication device to an external configuration computer unit.

This may take place, for example, via an interface. An interface is a part of a system that is used for communication, that is, the exchange of information or data between two communication participants. An exchange of data or signals can take place via an interface, with the exchange involving, for example, a sending or receiving of data. The exchange can additionally take place such that one communication participant actively requests or passively receives information or data from another communication participant. An interface may also be designed in diverse ways. The present invention is not limited to specific interfaces or designs of interfaces.

A communication link is, in particular, a connection between at least two communication participants, so that an exchange of information or signals or data is possible. The communication link in this case may be wired or wireless or else it may be made as a combination of wired and wireless connections. For example, it may be provided that a communication link is wired up to an exchange and then wireless from the exchange.

Communication participants may be any kind of subscribers and the present invention is not limited to specific communication participants. Thus, one communication participant may be, for example, a person or a piece of technical equipment. In this case, a communication device is assigned to a person, with the process of communication occurring via the communication device. In the case of a piece of technical equipment, the equipment must be appropriately designed. Combinations of communication participants are also conceivable. Thus, for example, a person can conduct communication with a piece of technical equipment, it being preferred that the communication link occur mutually between two pieces of technical equipment—for example, between a communication device and an external configuration computer unit.

An external configuration computer unit is preferably a piece of technical equipment, locally separated from the communication device, in which information or data for the configuration of the communication device is or are respectively deposited. For example, the external configuration computer unit may be an auto-configuration server (ACS).

Identification data are understood to mean, in particular, all data by means of which the communication device or a user of the communication device can be identified. The identification data in this case may consist, for example, of numbers or letters, with the present invention not being limited to this kind of identification data. Possibilities for the design of identification data will be elaborated on in the further course of this description.

In accordance with the invention, the identification data are transmitted from the communication device to the external configuration computer unit for the purpose of authentication of the communication device, that is, in order to authenticate the communication device at the external configuration computer unit.

An authentication is generally understood to mean the certification, that is, verification, of a claimed property of a party, which may be, for example, a person, a device, a document, or a piece of information.

The confirmation that concludes an authentication is also referred to as an authorization and, in regard to the claimed property, which may be, for example, an existing access authorization or authenticity, the authenticated party is then regarded as authentic.

Accordingly, the authentication preferably represents a process in which the identity of a person or object is checked by a control site. For this checking, transmitted identification data may be compared with stored identification data, for example. Provided that the transmitted identification data agree with the stored identification data, the authentication is successful. After an authentication, a further process, such as, for example, a transmission of configuration data, can take place.

Transmission in the intendment of the present invention is understood, in particular, such that information or signals or data can be transported from the communication device, which may be the first communication participant, to the external configuration computer unit, which may be the second communication participant. The transmission can obviously occur in the opposite direction or in both directions.

In accordance with the invention, chip card-related identification features are transmitted as identification data. The chip card-related identification features are related to a chip card. The chip card-related identification features enable the chip card to be uniquely identified and hence also the user to whom this chip card is assigned. These chip card-related identification features may be, for example, an identification code in the form, for example, of an identification number or the like, with the present invention not being limited to special identification features. Instead, all information or data may be understood as identification features, by means of which an identification of the chip card is possible.

The chip card to which the chip card-related identification features are assigned may be designed, for example, in the form of a smartcard or integrated circuit card (ICC). A chip card is preferably a card incorporating an integrated circuit, the so-called chip, which can contain a hardware logic, a memory, or else a microprocessor. In contrast to, for example, memory devices, such as USB sticks, CDs, DVDs, diskettes, or the like, chip cards generally do not serve to store large amounts of data. Also, in general, the data that are stored on a chip card may not be changed by normal users of the chip card. Normal users are understood in the intendment of the invention to be users who merely use the chip card, without being familiar with the overall technology or knowing it in detail.

An identification in accordance with the present invention is a synonym for identifying. It may be understood as an operation that serves for or leads to the unique recognition of a person or an object. An identification or an identifying generally takes place on the basis of characterizing features or with the aid of an identifier. For example, it may be provided that the chip card and/or the communication device is identified on the basis of chip type-related identification features.

If an authentication has taken place successfully on the basis of the identification data as described above, for example, the configuration of the communication device can take place in the next step.

The configuration can take place, for example, in such a manner that identification data are initially transmitted to the external configuration computer unit for authentication of the communication device. Following this, configuration data can be transmitted from the external configuration computer unit to the communication device and received there. The configuration data may be, in particular, data with which the communication device can be configured such that the communication device functions.

Functioning may be understood in the intendment of the present invention to mean that the communication device can be used. Thus, the communication device can be used, for example, in a communication network or IP network.

The receiving of the configuration data by the communication device can, for example, take place via an interface. This interface can be the interface already mentioned above or else an interface differing from it, that is, a second interface.

According to a second aspect of the invention or in further embodiment of the first aspect of the invention, a method for the configuration of a communication device is provided, in which a communication link between the communication device and an external configuration computer unit is created, in which identification data that is related to the communication device are transmitted from the communication device to the external configuration computer unit for the purpose of authentication of the communication device, with chip card-related identification features being transmitted as identification features, with the chip card-related identification features being assigned to a chip card for identification thereof, and with the chip card being assigned to the communication device, in which the transmitted identification data are authenticated in the external configuration computer unit, and in which, once authentication is successful, a configuration of the communication device is carried out.

For this method, reference is made in full to the explanation made above.

In contrast to the method according the first aspect, the external configuration computer unit is here also a part of the method. The identification data are transmitted to this external configuration computer for the purpose of authentication of the communication device. In accordance with the invention, the transmitted identification data are authenticated in the external configuration computer unit.

An authentication is generally understood as the certification, that is, a verification, of a claimed property of a party, which, for example, may be a person, a device, a document, or a piece of information.

The confirmation that concludes an authentication is also referred to as an authorization and, in regard to the claimed property, which may be, for example, an existing access authorization or authenticity, the authenticated party is then regarded as authentic.

Accordingly, the authentication preferably represents a process in which the identity of a person or object is checked by a control site. For this checking, transmitted identification data may be compared with stored identification data, for example. Provided that the transmitted identification data agree with the stored identification data, the authentication is successful. After an authentication, a further process, such as, for example, a transmission of configuration data, can take place.

Once the authentication in the external configuration computer unit has been successful, the configuration of the communication device takes place automatically. This can occur in various ways, as will be explained in greater detail further below.

The method according to the invention, as has been described for the two aspects of the method, serves in particular to authenticate a communication device, in which a chip card is located, at an external configuration computer unit by resorting, for the purpose of authentication, to information features that are present on the chip card and serve for identification of the chip card.

The preferred embodiments described below relate to both of the aforementioned aspects of the method.

Preferably, at least two different chip card-related identification features are transmitted as identification data. The chip card-related identification features are, in particular, the chip card-related identification features that have already been described further above and to which reference is made in full at this point.

Insofar as two different chip card-related identification features are to be transmitted, they are not identical. In this case, the invention is not limited to specific types of information features. This is advantageous particularly in view of security aspects, because, through the transmission and hence verification by way of several chip card-related identification features, access is made difficult for non-authorized users.

In further embodiment, the method for the configuration of a communication device in the form of a mobile phone, in particular, an LTE mobile phone, is depicted.

An LTE mobile phone is preferably a mobile phone that is suitable for the mobile phone long term evolution (LTE) standard, which may also be referred to as the 4G standard. Obviously, this does not mean that an LTE mobile phone makes use only of the LTE mobile telephony standard. It is also provided that an LTE mobile phone can also use other mobile telephony standards, besides the LTE mobile telephony standard, such as, for example, the universal mobile telecommunications system (UMTS) or the global system for mobile communications (GSM).

In contrast to GSM (2G) and UMTS (3G), the LTE (4G) mobile telephony technology no longer has a separate voice channel for telephony. Instead of this, only an Internet Protocol (IP) data channel is still provided, making it necessary to use VoIP technology for telephoning. As a result, it is also necessary to configure several data inputs for telephoning on the communication device. These data inputs entail at least a VoIP account and VoIP password.

In another embodiment, the method is also designed for the configuration of a communication device in the form of a landline device, in particular a DSL or VoIP device. It may also be designed for the configuration of a communication device for VoIP operation.

A landline device is a device that is preferably utilized in a locally restricted manner. An example of a landline device is a classical telephone that is used via a landline connection in an apartment or house, the present invention not being limited to specific types of landline devices. The landline device may preferably be a DSL or VoIP device. Such a DSL or VoIP device may, for example, be a modem or a router.

It is also preferably provided that the method is designed for the configuration of a communication device for VoIP operation. VoIP operation is understood in the intendment of the invention to mean that a communication between two communication participants takes place via VoIP technology, the communication participants being persons or technical equipment.

VoIP may be understood as telephoning via computer networks that are set up according to Internet standard. For the telephony in this case, typical information, such as, for example, voice and control information for connection setup, for example, is transmitted via a network that can also be used for data transmission. For the call participants, computers, communication devices specialized for IP telephony, and also classical telephones connected through special adapters may create the connection.

In another embodiment, the communication device can have an interface for creating a communication link in the form of a data link between the communication device and an external configuration computer unit. Alternatively, a communication link in the form of a data link between the communication device and an external configuration computer unit can be created.

In the case of a communication link in the form of a data link, preferably data are transferred or transmitted.

An interface is a part of a system that is used for communication, that is, the exchange of information or data between two communication participants. An exchange of data or signals can take place via an interface, with the exchange involving, for example, a sending or receiving of data. The exchange can additionally take place such that one communication participant actively requests or passively receives information or data from another communication participant. An interface may also be designed in diverse ways. The present invention is not limited to specific interfaces or designs of interfaces.

Via the interface(s) and the data link between the communication device and the external configuration computer unit, data can be transferred or transmitted from the communication device to the external configuration computer unit for the purpose of authentication of the communication device. From the external configuration computer unit, in turn, configuration data for the configuration of the communication device are transmitted to the communication device.

In another embodiment, it is provided that, for authentication in the external configuration computer unit, the transmitted identification data are compared with the stored identification data and that, if the transmitted identification data agree with the stored identification data, the configuration of the communication device is carried out.

Consequently, identification data of the communication device are transmitted to the external configuration computer unit and will be referred to in the following also as transmitted identification data. Stored in the external configuration computer unit are identification data, which will be referred to in the following as stored identification data. The stored identification data are preferably deposited by the telephone provider or a third party in the external configuration computer unit. However, it is also conceivable that the stored identification data are deposited in an external storage device and that the external configuration computer unit accesses this storage device during the authentication process.

During comparison of the transmitted identification data with the stored identification data, the transmitted identification data are compared with the stored identification data by checking, for example, the extent to which the transmitted identification data correspond to the stored identification data. Provided that the transmitted identification data and the stored identification data are in agreement, the configuration of the communication device takes place.

Fundamentally, the configuration of the communication device takes place automatically or following a single actuation. However, it may also be the case that each configuration step needs to be confirmed separately by the user.

The configuration can take place in various ways. For example, configuration data for the communication device are assigned to the stored identification data. If the transmitted identification data agree with the stored identification data, the configuration data assigned to the stored identification data are transmitted automatically to the communication device. For configuration of the communication device, configuration data are assigned to the identification data stored preferably in the external configuration computer unit. The configuration data in this case may also be located outside of the external configuration computer unit, with the external configuration computer unit being able to access this configuration data. Preferably, however, it is provided that the configuration data are stored in the external configuration computer unit.

In another embodiment, it may be provided that, after authentication has concluded, a communication takes place between the communication device and the external configuration computer unit such that device-typical data or information are or is respectively transferred from the communication device to the external configuration computer unit or else requested by the latter. On the basis thereof, the required configuration data can be transmitted.

Preferably, the configuration of the communication device is carried out, after authentication has taken place, by transmission of configuration data from the external configuration computer unit to the communication device. As already described further above, transmitted identification data are preferably compared with stored identification data during the authentication. Provided that these data are in agreement, that is, that the comparison or the authentication was successful, configuration data are transmitted. These configuration data are preferably data for configuration of the communication device.

The transmission of the configuration data in this case can occur automatically or on request and confirmation. However, it may also be the case that the transmission of the configuration data takes place remotely. It is also provided that the transmission of the configuration data and possibly the configuration of the communication device run in the background, so that the user of the communication device is not aware of anything. It is preferred that the configuration data is transmitted automatically.

In another embodiment, for the configuration of the communication device, VoIP access data are transmitted from the external configuration computer unit to the communication device. VoIP access data are understood, in particular, to be access data for VoIP technology. Thus, the communication device can be operated via VoIP technology. For such a VoIP operation, special settings on the communication device may be required. The required settings can be transmitted preferably in the VoIP access data from the external configuration computer unit to the communication device.

In another embodiment, a chip card, on which, for identification of the chip card, chip card-related identification features are stored, is assigned to the communication device. For configuration of the communication device, an authentication of the communication device is required beforehand. In this embodiment, the authentication does not take place on the basis of identification data of the communication device, but rather on the basis of the identification features stored on the chip card.

In another embodiment, the chip card-related identification features, which are transmitted as identification data, are read from the chip card by the communication device. In order for the communication device to be able to read the chip card-related identification features from the chip card, the communication device must be suitably designed. The reading of the chip card may take place in various ways and the present invention is not limited to a specific procedure for reading the chip card. Preferably, the reading of the chip card-related identification features takes place in the communication device.

The present invention is not limited to specific types of chip cards. Thus, for example, it may be provided that the chip card is designed as a SIM card.

It is preferably provided that the chip card in the form of a SIM card is assigned an International Mobile Subscriber Identity as chip card-related identification feature, with the International Mobile Subscriber Identity being transmitted as identification data from the communication device to the external configuration computer unit or it being possible to do so. Additionally or alternatively, in another embodiment, the chip card may be assigned a chip card-related PIN, in particular a SuperPIN, as chip card-related identification feature, with the chip card-related PIN being transmitted as identification data from the communication device to the external configuration computer unit or it being possible to do so.

Preferably, the chip card is designed as a SIM card. The SIM card, which may also be referred to as a subscriber identity module card, is preferably a chip card such as that used for mobile phones and serves for identification of the user. Normally, mobile telephony providers supply subscribers with mobile telephone connections and data links by way of the SIM card.

When connecting via mobile telephony technology, the user receives a subscriber identity module (SIM) card, via which the user is uniquely identifiable. As a result, a standard SIM card can be used instead of a numerical code for the remote installation of VoIP access data.

Preferably, an International Mobile Subscriber Identity (IMSI) is stored on the chip card for identification thereof or can be transmitted as identification data from the communication device to the external configuration computer unit.

The International Mobile Subscriber Identity (IMSI) is a number for unique identification of network subscribers in mobile telephony networks. In addition to further data, the IMSI is preferably stored on a special chip card, the so-called SIM (subscriber identity module). In this case, the IMSI has nothing to do with the telephone number that is assigned to the SIM card.

The IMSI consists of 15 digits and can be assigned uniquely to a SIM card worldwide. It is composed as follows:
  Mobile Country Code (MCC), 3 digits
  Mobile Network Code (MNC), 2 (or 3) digits
  Mobile Subscriber Identity Number (MSIN), 10 digits However, other types of chip card-related identification features are also possible. For example, a chip card-related identification feature can be a chip card-related PIN.

The chip card-related PIN is or can be transmitted as identification data from the communication device to the external configuration computer unit.

The PIN is a personal identification number or secret number, which preferably is known to one person only. By using the PIN, the user of a communication device can, for example, establish access to a communication network.

The SuperPIN, which is also referred to as the PUK, is an identification number that serves preferably to block a SIM card, for example. The number is normally not stored in the mobile phone; it is linked to the SIM card and needs to be determined subsequently at the manufacturer. Usually, the SuperPIN (PUK) has eight digits.

For example, the identification of the communication device can take place only through transmission of an identification feature, such as, for example, the IMSI. However, it is also possible that a combination of different types of chip card-related identification features is employed. For example, the identification of the communication device can take place in such a case through the transmission of several identification files, such as, for example, the IMSI and an additional identifier. As additional identifier, it is possible to use, for example, the PIN of a mobile phone and/or the SuperPIN, which is also referred to as the PUK (personal unblocking key). The present invention is not limited to specific identification data or identification numbers.

Preferably, in such a case, it may be provided that the chip card is designed as a SIM card, that an International Mobile Subscriber Identity is assigned to the chip card as chip card-related identification feature, that the chip card is assigned a chip card-related PIN as chip card-related identification feature, and that the International Mobile Subscriber Identity and the chip card-related PIN are transmitted or can be transmitted as identification data from the communication device to the external configuration computer unit. The PIN, as already mentioned above, can be any PIN, with preferably a SuperPIN being used.

According to another aspect of the invention, a communication device is provided. The communication device has an interface for creating a communication link from the communication device to an external configuration computer unit and an interface for receiving configuration data from the external configuration computer unit, it being possible to transmit identification data, which is related to the communication device, via the interface from the communication device to the external configuration computer unit. A chip card is assigned to the communication device. Chip card-related identification features are assigned to the chip card for identification thereof. The communication device is designed such that chip card-related identification features are transmitted or can be transmitted as identification data from the communication device via the interface to the external configuration computer unit.

A communication device is, for example, a piece of technical equipment or a device that serves to acquire, input, transmit, and output information or signals or data. The information that is to be transmitted may be, for example, voice data, with the present invention not being limited to specific kinds of information.

A communication device may be a stationary, that is, locally restricted device, such as a landline telephone, a fax machine, a personal computer, a server device, an Internet router, an Internet modem or the like. However, a communication device may also be a mobile device, such as, for example, a mobile phone, a portable computer, a netbook, a notebook, a navigation device, a personal digital assistant, or the like. The present invention is thus not limited to a specific communication device.

An interface is a part of a system that is used for communication, that is, the exchange of information or data between two communication participants. The interface may preferably be designed and function in a way such as described further above.

By means of the interface, it is possible to create a communication link, in particular as described further above.

An external configuration computer unit is preferably a piece of technical equipment, locally separated from the communication device, as described further above, in which information or data for the configuration of the communication device is or are respectively deposited.

As identification data that serve for identification of the communication device . . .[1] The identification data may be designed as described further above.

[1]Incomplete sentence—Translator's Note

Besides identification data used for authentication of the communication device at the external configuration computer, configuration data are transmitted from the external configuration computer unit to the communication device and received there. The configuration data—as described above—are data by means of which the communication device can be configured such that the communication device can be used.

In accordance with the invention, a chip card is further assigned to the communication device—as described further above.

In another embodiment, at least two different chip card-related identification features are assigned to the chip card for identification thereof and the communication device is designed such that the at least two different chip card-related identification features are transmitted or can be transmitted as identification data from the communication device via the interface to the external configuration computer unit.

The two different chip card-related identification features may—as described further above—be chip card-related identification features. The chip card-related identification features may entail, for example, the IMSI and the PIN, with it also being possible to use the SuperPIN as PIN.

Preferably, the communication device has means for carrying out the above-described method, so that, in regard to the embodiment and functionality of the communication devices, the preceding explanations regarding the aspects of the method are referenced and referred to in full.

With reference to the preceding explanations, the present invention may, in particular, also be described as follows.

For the authentication of communication devices at an external configuration computer unit, which may be an ACS (auto-configuration server), the subject of secure authentication arises regularly, because an ACS is generally accessible at will from the Internet and sensitive customer data, such as VoIP access data, which must be protected against misuse, are deposited there. On the other hand, the configuration of the communication device should be simple and secure for the customer. For the authentication of communication devices, chip cards in the form of standard SIM cards may be used, with only the customer knowing the PIN and the SuperPIN (PUK).

This can take place automatically for landline devices, such as, for example, a DSL or VoIP router. At the present time in mobile telephony, communication devices are not yet configured from the network under remote control via an external configuration computer unit. In the case of, for example, VoIP use, however, it is very reasonable to configure multiple individual customer data securely on the communication device. Accordingly, misuse can be avoided and the forgetting or loss of important access data by the user can be prevented. The aim is exclusively that the user has its chip card and knows the associated PIN and SuperPIN (PUK)—as already conventional in mobile telephony today—and accordingly receives VoIP access data or an individual configuration of the communication device from the external configuration computer unit.

Provided is a solution with chip cards in the form of standard SIM cards, without the necessity of storing an individual numerical code additionally on the chip card. In addition, the solution describes how a user, by using a chip card, can configure or install a landline network or LTE voice (VoiP) and Internet connection. To do this, the customer need only give the PIN and/or SuperPIN (PUK) of the chip card.

Described is the possibility, by means of a chip card, of configuring a mobile telephony or landline network communication device with individual sensitive configuration data, such as, for example, VoIP access data, automatically and in a user-friendly manner. To this end, an external configuration computer unit, an ACS in the IP network, is used, which utilizes the information of a chip card, for example, the IMSI and SuperPIN (PUK), as customer reference. The communication device sends the information of the chip card for authentication to the external configuration computer unit and subsequently receives the individual configuration data of the communication device.

If, then, unique identification features of the SIM card are additionally deposited on the external configuration computer unit for the individual configuration of the communication device, such as, for example, VoIP access data, an automatic authentication mechanism is established between the communication device with chip card and the external configuration computer unit via a communication link and the configuration of the communication devices takes place fully automatically.

The communication device can read data from the chip card that uniquely identifies the chip card. Included here is, for example, the IMSI.

Once the individual configuration data are configured on the communication device, the communication device can complete a VoIP voice setup via the VoIP platform in the network and thus actuate any telephone calls for the VoIP accounts assigned to it in the landline network or other mobile networks.

The invention will now be illustrated in more detail on the basis of exemplary embodiments, with reference to the attached drawings. Shown are.

Figure 1:
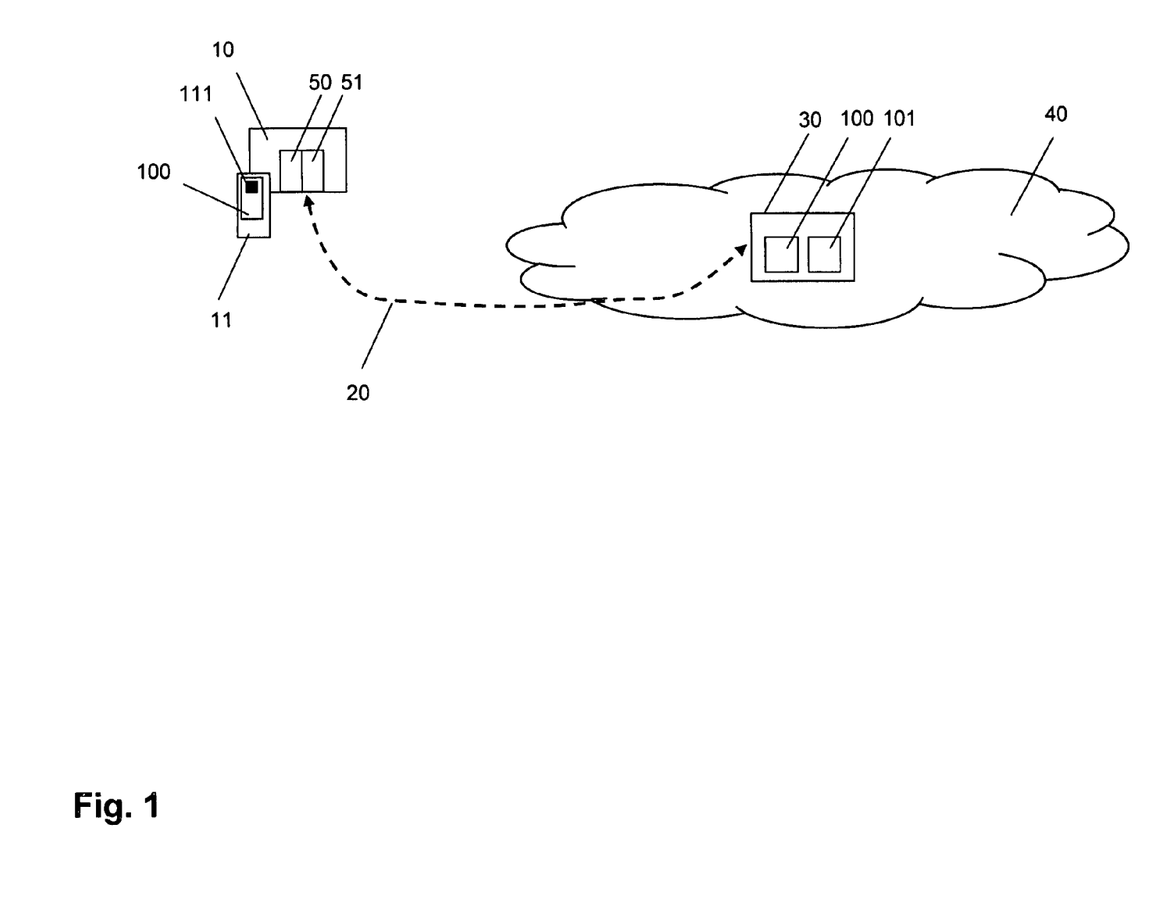
FIG. 1 in schematic illustration, the procedure for configuration of a communication device in accordance with the invention.

Illustrated schematically in FIG. 1 is the procedure for configuration of a communication device 10 in accordance with the invention.

The communication device 10 has an interface 50 for transmitting identification data 100, which serves for authentication of the communication device 10. Furthermore, the communication device 10 has an interface 51 for receiving configuration data 101 as well as a chip card 11. Stored on the chip card 11 are chip card-related identification features 111.

For configuration of the communication device 10, various settings and changes of parameters in the communication device 10 must be made. The configuration data 101 required for this are stored in an external configuration computer unit 30.

For authentication of the communication device 10, which may be a mobile phone or a DSL or VoIP router or modem and the like, the chip card-related identification features 111, which are stored on the chip card 11, are used as identification data 100. The chip card 11 is a SIM card.

For this purpose, the communication device 10 must have a slot for a chip card 11 in order to be able to read data, such as, for example, the identification data 100 or the chip card-related identification features 111 of the chip card 11. In the network 40, identification data 100, such as, for example, the chip card-related identification features 111 of the chip card 11, are stored along with configuration data 101, which, for example, may be VoIP access data, on the external configuration computer unit 30. The external configuration computer unit 30 may be an auto-configuration server (ACS).

Preferably, two different types of chip card-related identification features 111 are transmitted as identification data 100. The chip card-related identification features 111 stored on the chip card 11 may be the IMSI and the SuperPIN (PUK).

When the communication device 10 sends the chip card-related identification features 111, such as, for example, the IMSI, together with the SuperPIN (PUK), as identification data 100 to the external configuration computer unit 30, this taking place via a communication link 20, in particular a data link, and when the external configuration computer unit 30 has deposited the corresponding configuration data 101 with these identification data 100, such as, for example, VoIP access data, the communication device 10 can be automatically configured, once authentication has taken place, by means of the configuration data 101. The authentication can take place, for example, by comparison of the identification data 100 with the identification data 100 stored in the external configuration computer unit 30. For a successful authentication, it is required that the transmitted identification data 100 and the stored identification data 100 are in agreement.

For example, it may be provided that the identification data 100 linked to configuration data 101 are stored in the external configuration computer unit 30.

The configuration data 101 are sent from the external configuration computer unit 30 via the communication link 20 to the communication device 10. There, the configuration data 101 may be input into the communication device 10 via the interface 51, it being conceivable that only one interface is used for sending and receiving the identification data 100 and the configuration data 101.

The combination of IMSI and SuperPIN (PUK) is mentioned here as identification data 100 only by way of example and can be used both for mobile telephony and landline network communication devices 10.

Figure 2:
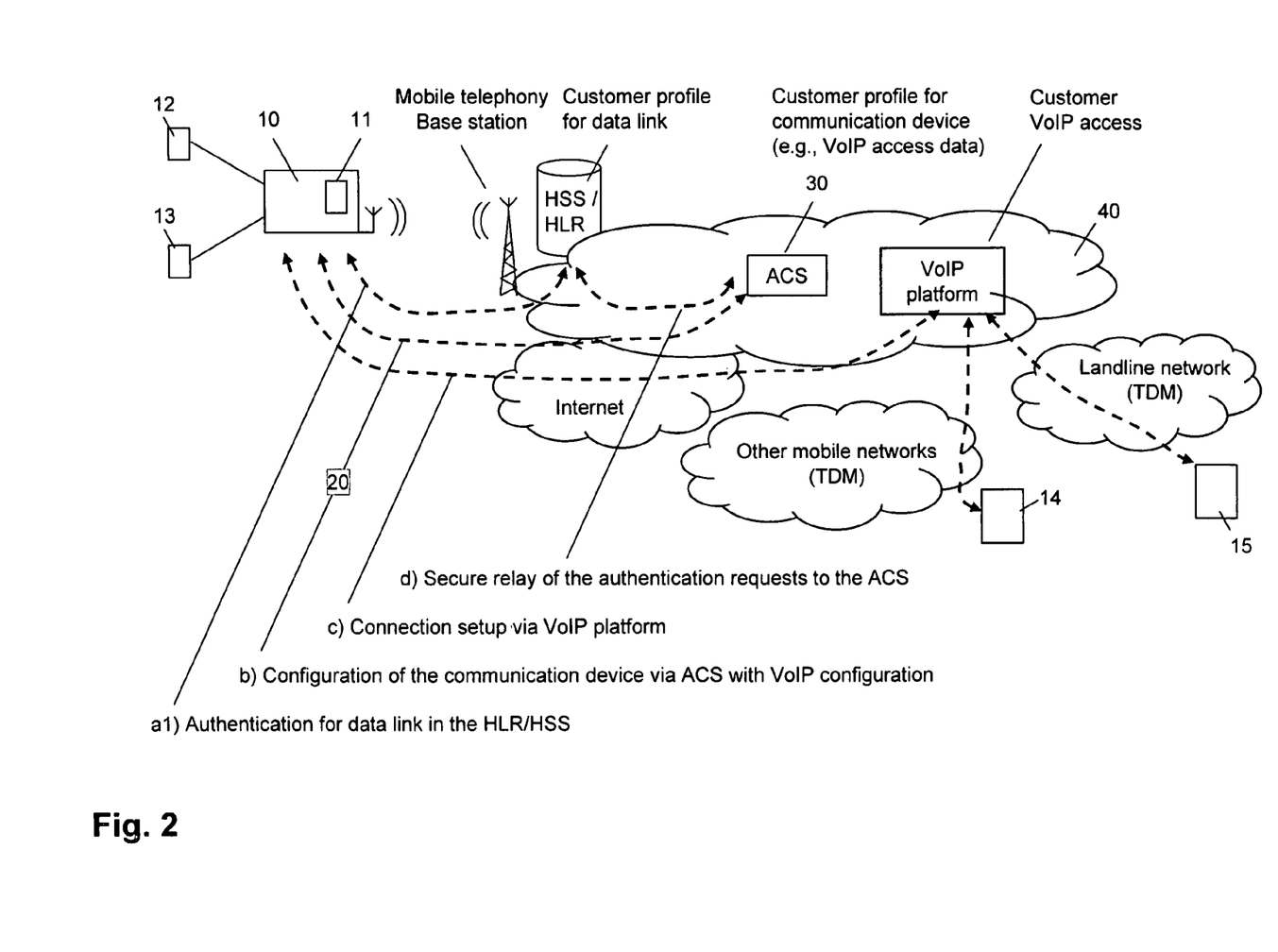
FIG. 2 an overview of various possible procedures for the configuration of a communication device and use of a correspondingly configured communication device as intended.

Illustrated in FIG. 2 is an overview of various possible procedures for the configuration of a communication device 10 and the use of a correspondingly configured communication device 10 as intended.

For the configuration of the communication device 10, an authentication of the configuration device[2] 10 is initially required, it being possible for the authentication as well as the configuration of the communication device 10 to take place as already described in FIG. 1, so that reference is made to FIG. 1.

[2]sic; communication device?—Translator's Note

However, a configuration of the communication device 10 is also possible as described below. Used in this case is an authentication via data link in the HLR/HSS according to a) in connection with a secure relay of the authentication request to the ACS according to d).

If the communication device 10 is, for example, a mobile phone, the authentication of the communication device 10 can take place by means of an authentication via a data link in the home location register (HLR)/subscriber server (HSS). For authentication of the communication device 10, a customer profile for a data link can be stored on the HLR/HSS by means of wireless connection via mobile telephony base stations and a standardized logon of the communication device 10 in the network 40 can take place. Required for configuration of the communication device 10 in such a procedure would be a coupling of the authentication in the home location register (HLR)/home subscriber server (HSS) with the authentication in the external configuration computer unit 30, such as, for example, the ACS, in order to be able to load the VoIP configuration from the ACS. This takes place via a secure relay of the authentication request to the ACS. For this purpose, however, the ACS may be reached exclusively via such authentication requests and not via other Internet accesses, so as to prevent misuse. However, this is not feasible.

As already described in FIG. 1, the authentication of the communication device 10 can take place by means of authentication via the ACS with VoIP configuration b). For such an authentication of the communication device 10 by means of a chip card 11, a communication link 20 is set up between the communication device 10 and the external configuration computer unit 30, which can represent an ACS. This procedure was already described in FIG. 1, so that reference is made in full here to FIG. 1.

For the use of a correspondingly configured communication device 10 as intended, the communication device 10 can represent a DSL or VoIP router. A telephone 12 or a computer 13 may be connected to such a router. After configuration of the communication device 10 according to the explanation in regard to FIG. 1, a VoIP connection can be set up with the communication device 10 via a VoIP platform c) between the telephone 12 or the computer 13 and other communication devices 14, 15. When this connection is set up, a connection via a VoIP platform can be set up by means of customer VoIP access with another landline network (TDM) after configuration of the communication device 10. A mobile phone 14 can be assigned to the other mobile network, a landline telephone 15 to the landline network, so that a communication link between the telephone 12 or the computer 13 and the mobile phone 14 or the landline telephone 15 can be created via the communication device 10.

LIST OF REFERENCES

10 communication device
11 chip card
12 telephone
13 computer
14 mobile phone
15 landline telephone
20 communication link
30 external configuration computer unit
40 network
50 interface
51 interface
100 identification data
101 configuration data
111 chip card-related identification features

The invention claimed is:
1. A method for the configuration of a communication device for making certain adaptions of the communication device, characterized by the following steps:
 a communication link is created from the communication device to an external configuration computer unit;
 identification data, which are related to the communication device, are transmitted from the communication device to the external configuration computer unit for the purpose of authentication of the communication device, with chip card-related identification features being transmitted as identification data, with the chip card-related identification features being assigned to a chip card for identification thereof, and with the chip card being assigned to the communication device, wherein the chip card is designed as a SIM card, the chip card is assigned an International Mobile Subscriber Identity as chip card-related identification feature, the chip card is assigned a chip card-related PIN, in particular a Super-PIN, as a chip card-related identification feature, and the International Mobile Subscriber Identity and the chip card-related PIN are transmitted, as identification data as two different chip-card related identification features, from the communication device to the external configuration computer unit;
 when authentication is successful, a configuration of the communication device is carried out, whereby configu- ration data are transmitted from the external configuration computer to the communication device and received there.

2. The method according to claim 1, characterized in that the transmitted identification data are authenticated in the external configuration computer unit.

3. The method according to claim 1, further characterized in that it is designed for the configuration of a communication device in the form of a mobile phone, in particular an LTE mobile phone, and/or that it is designed for the configuration of a communication device in the form of a landline device, in particular a DSL or VoIP device, and/or it is designed for the configuration of a communication device for VoIP operation.

4. The method according to claim 1, further characterized in that the communication device has an interface for creating a communication link in the form of a data link between the communication device and an external configuration computer unit or that a communication link in the form of a data link is created between the communication device and an external configuration computer unit.

5. The method according to claim 1, further characterized in that, for authentication in the external configuration computer unit, the transmitted identification data are compared with the stored identification data and that, if the transmitted identification data agree with the stored identification data, the configuration of the communication device is carried out.

6. The method according to claim 5, further characterized in that configuration data for the communication device are assigned to the stored identification data and that, if the transmitted identification data agree with the stored identification data, the configuration data assigned to the stored identification data are transmitted automatically to the communication device.

7. The method according to claim 1, further characterized in that the configuration of the communication device is carried out by transmission of configuration data from the external configuration computer unit to the communication device after authentication has taken place.

8. The method according to claim 7, further characterized in that it is designed for the configuration of a communication device in the form of a mobile phone, in particular an LTE mobile phone, and/or that it is designed for the configuration of a communication device in the form of a landline device, in particular a DSL or VoIP device, and/or it is designed for the configuration of a communication device for VoIP operation and further characterized in that, for configuration of the communication device, VoIP access data are transmitted from the external configuration computer unit to the communication device.

9. The method according to claim 1, further characterized in that the Chip card-related identification features, which are transmitted as identification data, are read by the communication device from the chip card.

10. A communication device having an interface for creating a communication link from the communication device to an external configuration computer unit, having an interface for receiving configuration data for making certain adaptions of the communication device from the external configuration computer unit, having identification data, which are related to the communication device and can be transmitted via the interface from the communication device to the external configuration computer unit, characterized in that a chip card is assigned to the communication device, that chip card-related identification features are assigned to the chip card for identification thereof, that the communication device is designed such that chip card-related identification features are transmitted, as identification data, from the communication device via the interface to the external configuration computer unit, that the chip card is designed as a SIM card, that the chip card is assigned an International Mobile Subscriber Identity as a chip card-related identification feature, that the chip card is assigned a chip card-related PIN, in particular a SuperPIN, as a chip card-related identification feature, and that the International Mobile Subscriber Identity and the chip card-related PIN are transmitted, as identification data as two different chip-card related identication features, from the communication device to the external configuration computer unit.

11. The communication device according to claim 10, further characterized in that it has means for carrying out a method for the configuration of a communication device, characterized by the following steps:

a communication link is created from the communication device to an external configuration computer unit;

identification data, which are related to the communication device, are transmitted from the communication device to the external configuration computer unit for the purpose of authentication of the communication device, with chip card-related identification features being transmitted as identification data, with the chip card-related identification features being assigned to a chip card for identification thereof, and with the chip card being assigned to the communication device;

when authentication is successful, a configuration of the communication device is carried out.

* * * * *